3,139,376
METHOD FOR CONTROLLING NEMATODES WITH N-ALIPHATIC HYDROCARBON TRIMETHYLENE DIAMINES
Everett E. Gilbert, Morris Township, Morris County, N.J., assignor to Allied Chemical Corporation, New York, N.Y., a corporation of New York
No Drawing. Filed Mar. 14, 1962, Ser. No. 179,807
9 Claims. (Cl. 167—22)

The present invention relates to a process for treating soil infested with nematodes.

Plants subjected to attack by nematodes are damaged primarily as a result of the feeding of the nematodes on the plant tissues. The damage is generally manifested by the growth of galls, root-knots and other abnormalities. Such galls or root-knots contain nematodes and/or nematode larvae. Gall formation not only reduces the size and effectiveness of the root system but also seriously affects other plant parts so that, unless treated, the plant dies.

The principal object of this invention is to provide nematocides which are extremely toxic to nematodes present in the soil and less toxic to plants than nematocides now in use. Other objects and advantages will be apparent from the following description.

The term "soil" as used herein is intended to include any medium capable of supporting the growth of plants. It is intended, therefore, to include in addition to soil, humus, manure, compost and sand.

At the present time, fumigants such as ethylene dibromide, dichloropropene-dichloropropane mixture and chloropicrin are the chemicals most extensively used as nematocides on a commercial scale. All of these fumigants are phytotoxic to such an extent that it is necessary to treat the soil several weeks prior to planting of a crop in order that the fumigant may leave the soil.

According to the present invention, nematodes are effectively controlled by treating nematode-infested soil with a toxic quantity of an N-aliphatic hydrocarbon substituted trimethylene diamine having the following structural formula:

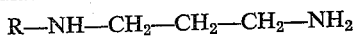

wherein R is a straight chain aliphatic hydrocarbon group having 8 to 22 carbon atoms, preferably 12 to 18 carbon atoms.

R in the above formula may be a straight chain saturated or a straight chain unsaturated aliphatic hydrocarbon group or a mixture of straight chain saturated and/or straight chain unsaturated aliphatic hydrocarbon groups. These groups include, for example, alkyl, alkenyl and alkinyl. The preferred N-aliphatic hydrocarbon substituted trimethylene diamines are those in which the aliphatic hydrocarbon groups are derived from fatty acid materials such as coconut oil, technical grade oleic acid, tallow and soybean oil. These diamines are prepared in conventional manner by converting the fatty acid material to the corresponding primary amine and reacting the primary amine with acrylonitrile, followed by hydrogenation. The reactions involved may be represented by the following equations:

(1) 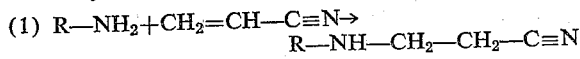

(2) 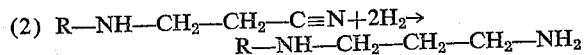

The resulting diamines, known commercially as "Duomeens," comprise mixtures of compounds containing straight chain saturated and straight chain unsaturated aliphatic hydrocarbon groups having 12 to 18 carbon atoms. The chemical structure of the diamines, which possess an amine content of approximately 83% calculated as the diamine, are summarized below:

| Source of R | Structure of R | | | |
|---|---|---|---|---|
| | Percent Saturated | Percent Unsaturated | Percent $C_{12}$–$C_{14}$ | Percent $C_{18}$ |
| Coconut Oil | 93 | 7 | 68 | 9 |
| Technical Grade Oleic Acid | 13 | 86 | 5 | 84 |
| Tallow | 56 | 43 | 5 | 62 |
| Soybean Oil | 34 | 66 | 1 | 73 |

Other compounds coming within the scope of the structural formula given above which may be effectively employed as nematocides include those made from long-chain amines derived from other sources than animals or plants—i.e. from petroleum or coal.

Control of nematodes by use of such N-aliphatic hydrocarbon substituted trimethylene diamines has been found to strikingly improve the growth characteristics of crop plants. Thus, such plants raised in the treated soil have more luxuriant tops and roots and are of a greater total weight than those obtained from untreated soil.

The N-aliphatic hydrocarbon substituted trimethylene diamines may be introduced into the soil in a variety of nematocidal compositions. The nature of these compositions will depend primarily upon the particular application contemplated. The compositions may be applied to the nematode-infested soil in any conventional manner, as by spraying or drenching.

In a preferred embodiment of the invention, the N-aliphatic hydrocarbon substituted trimethylene diamines are distributed in the soil by introduction in water, such as that employed to irrigate the soil. In this procedure, the amount of water may be varied in accordance with the moisture content and the moisture equivalent of the soil.

The N-aliphatic hydrocarbon substituted trimethylene diamines may be used for controlling nematodes in either pre-emergent or post-emergent treatment without substantially affecting crops planted or growing in the soil.

The N-aliphatic hydrocarbon substituted trimethylene diamines are effective as nematocides when distributed in the infested soil at dosage of at least about 50 pounds per acre, as in the order of about 50 to 300 pounds per acre. Particularly outstanding results are obtained with use of about 200 to 250 pounds per acre. In the case of post-emergent treatment, dosage of about 50 to 200 pounds per acre is generally employed.

The following examples illustrate the invention but are not to be construed as limiting the same.

EXAMPLE 1

When a *Panagrellus redivivus* nematode is suspended in water, it flexes its body at a substantially constant rate. Hence, the effect of a nematocide can be estimated by counting the rate of flexing action. This motility of the nematode is observed through a microscope and the number of flexures is counted, the effect of the nematocide being expressed as a percentage of the normal flexing rate of a control suspension not containing a nematocide.

Following Table 1 sets forth the motility of nematodes using various N-aliphatic hydrocarbon substituted trimethylene diamines coming within the scope of this invention. The materials were tested by introducing them into an aqueous *Panagrellus redivivus* nematode suspension at concentrations of 0.0015 and 0.003% calculated on the volume of nematode suspension. Comparison was made with N-loralkyl ethylene diamine, a prior art nematocide in which the loralkyl group represents a mixture of alkyl groups having 10, 12, 14, 16 and 18 carbon atoms, at the concentration of 0.003%. The motility of the nematodes was observed at intervals of time ranging from 10 to 120 minutes.

*Table 1*

| Toxicant | Percent Motility at 0.003% (30 p.p.m.) Concentration After— | | | | | Toxicant | Percent Motility at 0.0015% (15 p.p.m.) Concentration After— | | |
|---|---|---|---|---|---|---|---|---|---|
| | 10 Min. | 20 Min. | 30 Min. | 60 Min. | 120 Min. | | 10 Min. | 20 Min. | 30 Min. |
| 1 | 5 | 0 | 0 | | | 1 | 10 | 2 | 0 |
| 2 | 3 | 0 | 0 | | | 2 | 10 | 3 | 0 |
| 3 | 3 | 0 | 0 | | | 3 | 10 | 1 | 0 |
| 4 | 5 | 1 | 0 | | | 4 | 10 | 1 | 0 |
| N-Loralkyl Ethylene Diamine | 75 | 75 | 75 | 50 | 25 | | | | |
| Do | 75 | 50 | 25 | 25 | 25 | | | | |

1—N-aliphatic hydrocarbon substituted trimethylene diamine in which the aliphatic hydrocarbon group is derived from coconut oil.
2—N-aliphatic hydrocarbon substituted trimethylene diamine in which the aliphatic hydrocarbon group is derived from technical grade oleic acid.
3—N-aliphatic hydrocarbon substituted trimethylene diamine in which the aliphatic hydrocarbon group is derived from tallow.
4—N-aliphatic hydrocarbon substituted trimethylene diamine in which the aliphatic hydrocarbon group is derived from soybean oil.

It is seen from the above table that the nematocides of the present invention are far more toxic to nematodes at a substantially lower dosage than the prior art N-loralkyl ethylene diamine.

EXAMPLE 2

The nematocidal activity of the N-aliphatic hydrocarbon substituted trimethylene diamines employed in Example 1 was determined by a procedure essentially as described by Schuldt and Bluestone in "Contributions of the Boyce Thompson Institute," volume 19, page 65 (1957). Approximately 100 *Panagrellus redivivus* nematodes in aqueous suspension were added to 5 cc. of an aqueous solution containing 1 p.p.m. of the N-aliphatic hydrocarbon substituted trimethylene diamine toxicant, and nematode mortality was recorded over a four day period. The results are given in the following table:

*Table 2*

| Toxicant | Percent Kill After (Days) | | |
|---|---|---|---|
| | 1 | 2 | 4 |
| 1 | 10 | 25 | 95 |
| 2 | 95 | 100 | 100 |
| 3 | 95 | 100 | 100 |
| 4 | 95 | 100 | 100 |

EXAMPLE 3

A post-emergent test was conducted by spraying the N-aliphatic hydrocarbon substituted trimethylene diamine toxicants employed in Example 1 as acetone solutions on soil around nematode-infested barberry plants (*Barberis Thunbergi atropurpurea*) at a dosage of 150 pounds per acre. Soil samples were taken two weeks after treatment and examined as follows:

Approximately one pint of soil sample was screened to remove roots and stems. This screened sample was extracted by the standard Baermann funnel technique for 24 hours. At the end of this period, 50 cc. of liquid was withdrawn and agitated. A 5 cc. portion of the extracted liquid was transferred to a Syracuse watch glass which had been marked off into eight sections for counting purposes. Nematodes present in the samples were counted under a binocular microscope using 30 magnifications.

The number of nematodes counted was multiplied by 10. The data obtained are given below.

*Table 3*

| Toxicant: | Number nematodes found per pint of soil |
|---|---|
| 1 | 200 |
| 2 | 200 |
| 3 | 180 |
| 4 | 200 |
| Check | 790 |

No injury to the barberry plants was noted.

EXAMPLE 4

A test similar to that described in Example 3 was carried out on nematode-infested Andromeda plants (*Pieris japonica*). Soil samples were taken one month after treatment and were examined as set forth above. The following results were obtained.

*Table 4*

| Toxicant: | Number nematodes found per pint of soil |
|---|---|
| 1 | 220 |
| 2 | 220 |
| 3 | 200 |
| 4 | 330 |
| Check | 660 |

No injury to the Andromeda plants was noted.

Since many differing embodiments may be made in this invention without departing from the scope and spirit thereof, it is intended to be limited only as indicated in the appended claims.

I claim:
1. A process for controlling nematodes which comprises treating nematode-infested soil with a toxic quantity of an N-aliphatic hydrocarbon substituted trimethylene diamine having the following structural formula

$$R-NH-CH_2-CH_2-CH_2-NH_2$$

wherein R is a straight chain aliphatic hydrocarbon group having 8 to 22 carbon atoms.

2. A process for controlling nematodes which comprises treating nematode-infested soil with a toxic quantity of an N-aliphatic hydrocarbon substituted trimethylene diamine having the following structural formula $$R-NH-CH_2-CH_2-CH_2-NH_2$$

wherein R is a straight chain aliphatic hydrocarbon group having 12 to 18 carbon atoms.

3. A process for controlling nematodes which comprises treating nematode-infested soil with a toxic quantity of N-aliphatic hydrocarbon substituted trimethylene diamine in which the aliphatic hydrocarbon group is derived from a fatty acid material selected from the group consisting of coconut oil, technical grade oleic acid, tallow and soybean oil.

4. A process for controlling nematodes which comprises treating nematode-infested soil with a toxic quantity of N-aliphatic hydrocarbon substituted trimethylene diamine in which the aliphatic hydrocarbon group is derived from coconut oil.

5. A process for controlling nematodes which comprises treating nematode-infested soil with a toxic quantity of N-aliphatic hydrocarbon substituted trimethylene diamine in which the aliphatic hydrocarbon group is derived from technical grade oleic acid.

6. A process for controlling nematodes which comprises treating nematode-infested soil with a toxic quantity of N-aliphatic hydrocarbon substituted trimethylene diamine in which the aliphatic hydrocarbon group is derived from tallow.

7. A process for controlling nematodes which comprises treating nematode-infested soil with a toxic quantity of N-aliphatic hydrocarbon substituted trimethylene diamine in which the aliphatic hydrocarbon group is derived from soybean oil.

8. A process for controlling nematodes which comprises treating nematode-infested soil with an N-aliphatic hydrocarbon substituted trimethylene diamine having the following structural formula $$R-NH-CH_2-CH_2-CH_2-NH_2$$

wherein R is a straight chain aliphatic hydrocarbon group having 8 to 22 carbon atoms at dosage of at least about 50 pounds per acre.

9. A process for controlling nematodes which comprises treating nematode-infested soil with an N-aliphatic hydrocarbon substituted trimethylene diamine having the following structural formula $$R-NH-CH_2-CH_2-CH_2-NH_2$$

wherein R is a straight chain aliphatic hydrocarbon group having 12 to 18 carbon atoms at dosage of about 50 to 300 pounds per acre.

References Cited in the file of this patent

UNITED STATES PATENTS

| | | |
|---|---|---|
| 2,736,658 | Pfohl et al. | Feb. 28, 1956 |
| 2,979,434 | Santmyer | Apr. 11, 1961 |